Aug. 30, 1949.　　　　D. BRADBURY　　　　2,480,114
METHOD OF MAKING BEARINGS
Filed Oct. 2, 1946

WITNESSES:
H. B. Brown
V. V. Novak

INVENTOR
DONALD BRADBURY.
BY
ATTORNEY

Patented Aug. 30, 1949

2,480,114

UNITED STATES PATENT OFFICE 2,480,114

METHOD OF MAKING BEARINGS

Donald Bradbury, Prospect Park, Pa., assignor to Westinghouse Electric Corporation, East Pittsburgh, Pa., a corporation of Pennsylvania Application October 2, 1946, Serial No. 700,779

2 Claims. (Cl. 29—149.5)

The invention relates to a bearing and its method of manufacture and it has for an object to provide a bearing constructed and arranged to avoid shaft vibration due to oil film instability.

The problem of "oil whip," that is, low frequency vibration of a rotating shaft caused by dynamic instability in the oil film, is one of increasing importance as operating speeds are increased and rotor weights become smaller. Theoretically, a "tiling pad" bearing has the advantage of giving stability, and the present invention has for a more particular object the formation of a bearing of this type so that this advantage may be practically realized.

The foregoing and other objects are effected by the invention as will be apparent from the following description and claims taken in connection with the accompanying drawings, forming a part of this application, in which:

Figure 5:
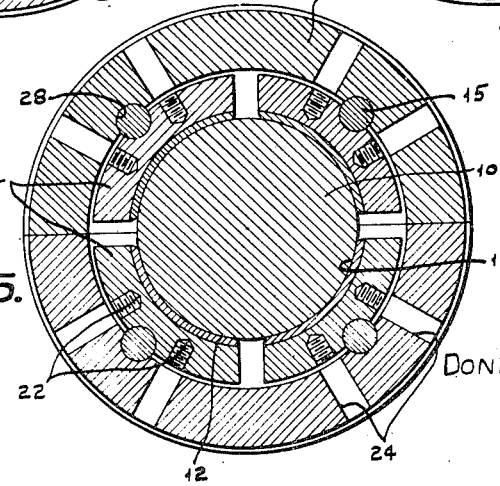
Fig. 5 is a sectional view showing the pads fitting the journal and supported from the shell by the pins, the fastening screws and the shims having been removed.

In the drawing (Fig. 5), there is shown a journal 10 fitting bearing surfaces 11 formed in the babbetted facings 12 of the circumferential series of segmental pads 14. The pads are supported by pins 15 carried by the bearing shell 16.

The bearing shell 16 is bored cylindrically to provide end lands 17 separated by an internal channel 18 having a cylindrical bottom surface 20.

Figure 1:
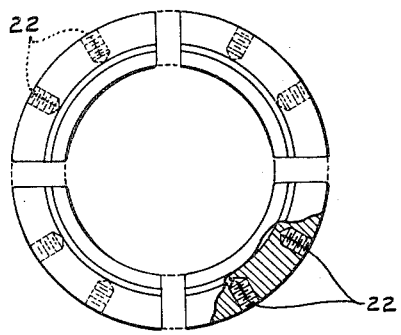
Fig. 1 is a detail view of a circumferential series of pads which are subject to the finishing procedure hereinafter described.

The pads 14 are formed by providing an internally babbetted cylindrical tube of slightly less length than the width of the channel 18 and whose outside diameter is slightly less than the diameter of the channel bottom cylindrical surface 20. As may be seen from Fig. 1, the babbetted tube is cut or has short arcuate sections tnereof removed to provide a circumferential series of pads 14 and the backs of the pads are tapped, as shown at 22.

Figure 2:
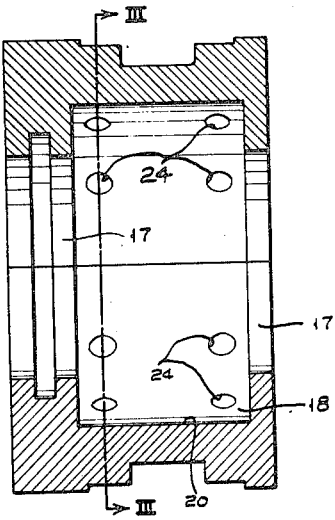
Fig. 2 is a longitudinal sectional view of a bearing shell for the pads.
Figure 3:
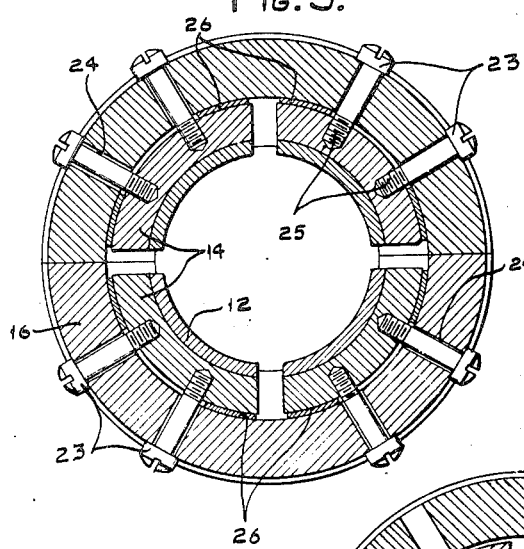
Fig. 3 is a transverse sectional view showing the pads temporarily fastened in spaced relation with respect to the shell for boring operations.
Figure 4:
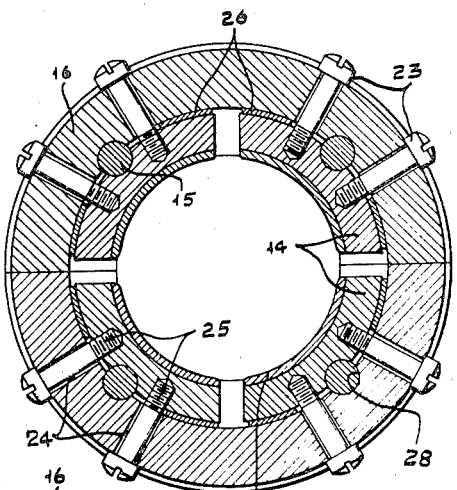
Fig. 4 is a view similar to Fig. 3 but showing pins inserted in openings bored centrally of the pads and of the clearance space between the latter and the shell, after which the babbett facings of the pads are bored.

The pads are then inserted in the channel 18 and are connected to the shell by screws 23 extending through the shell openings 24 and having their inner threaded ends 25 engaging the tapped openings 22 of each pad. As indicated in Fig. 2, the shell has the openings 24 disposed adjacent to opposite sides of the channel so that there are four screws 23 for each pad.

Shims 26 of uniform thickness are inserted between the pads and the channel bottom surface and the screws are tightened to firmly secure the pads in place with respect to the shell.

With the pads spaced by shims and held tight by the screws, cylindrical openings 28 are bored in the shell and in the pads to receive the cylindrical pins 15. These openings are bored along axes which are parallel to the axis of the cylindrical channel bottom surface 20 and are centered with respect to the pads 14 and the clearance between the latter and the channel bottom surface, as determined by the thickness of the shims 26. The shims adjacent to one edge of each shoe and the adjacent screws are then removed and the shoe is then firmly clamped against the remaining shims and the inserted pin by tightening the remaining screws. The assembly is then bored, on the axis of the channel bottom surface, the boring being to the same diameter as the journal 10, if bearing pads are carried by the bottom half of the bearing, or to slightly larger diameter to provide wedge-film clearance, if, as shown, a full circumferential series of shoes is employed. The pads are then removed and the lands 17 are bored to give a clearance appropriate to the journal.

A bearing, constructed as described, has the advantages of "anti-whip" qualities, simplicity of manufacture, and interchangeability with standard bearings, thereby making it useful in the correction of the whipping difficulty when encountered with apparatus incorporating conventional bearings. In connection with the manufacturing procedure, errors which would otherwise be introduced into the bearing because of small pin diameter variations are avoided because, with the shims at one edge of each shoe removed and the shoe clamped against the remaining shims and the pin, followed by boring, it is assured that all of the shoes have their bearing faces uniformly spaced radially from the journal axis.

While the invention has been shown in but one form, it will be obvious to those skilled in the art that it is not so limited, but is susceptible of various changes and modifications without departing from the spirit thereof.

What is claimed is:

1. The method of making a bearing so as to avoid shaft vibration due to oil film instability and which comprises providing a journal, a shell and an internally babbetted tube of slightly less external diameter than the internal diameter of the shell, cutting the tube into segments to form bearing pads, temporarily fastening the pads to the shell and spaced from the latter by shims at the leading and trailing edges, boring a cylindrical opening partly in each pad and partly in the shell with the openings centered circumferentially of the respective pads and with respect to the clearance spaces between the pads and the internal cylindrical surface of the shell and with the axes of the openings extending parallel to the axis of said shell cylindrical surface, inserting in the openings cylindrical pins formed to fit the latter, removing the shims at one edge of each pad and then re-fastening the pad to the casing so as to clamp against the remaining shims and the inserted pin, boring the babbett facings of the segmental pads so that the bearing surfaces thereof are elements of a cylindrical surface coaxial with the journal surface and of a diameter to give appropriate wedge-film clearance with respect to the journal, and removing the temporary fastening means and shims so that the pads are supported from the shell only through the pins.

2. The method of making a bearing so as to avoid shaft vibration due to oil film instability and comprising providing a journal and a shell, boring the shell cylindrically to provide end lands separated by a circumferential channel whose bottom surface is cylindrical, providing an internally babbetted cylindrical tube of a length slightly less than the channel width and of an outside diameter slightly less than the inside diameter of the shell, dividing the tube to form a circumferential series of pads, clamping the pads to the shell with the pads disposed circumferentially in the channel and spaced from the bottom surface thereof by shims at the leading and trailing edges thereof, boring a cylindrical opening partly in each pad and partly in the shell with the openings centered circumferentially of their respective pads and with respect to the clearance spaces between the latter and the channel bottom surface, inserting in the openings cylindrical pins formed to fit the latter, unclamping the pads and removing the shims at one edge of each pad and then re-clamping the pad to the casing so as to clamp against the remaining shims and the inserted pin, boring the babbett facings of the pads so that the bearing surfaces thereof are elements of a cylindrical surface which is coaxial with the channel bottom surface and of a diameter to give wedge-film clearance with respect to the journal, removing the clamping means, shims and pads, boring the lands coaxially with the channel bottom surface to provide a desired oil sealing clearance with respect to the journal, and reassembling the pads in the shell with the pins fitting the pad and shell portions of the openings to space the pads from the channel bottom surface and thereby to provide for pivoting of the pads with respect to the shell.

DONALD BRADBURY.

REFERENCES CITED

The following references are of record in the file of this patent:

UNITED STATES PATENTS

| Number | Name | Date |
|---|---|---|
| 675,975 | Riebe | June 11, 1901 |
| 1,161,721 | Parsons | Nov. 23, 1915 |
| 1,289,887 | Otis | Dec. 31, 1918 |
| 1,465,988 | Kingsbury | Aug. 28, 1923 |
| 1,714,568 | Pater | May 28, 1929 |
| 1,759,234 | Layne | May 20, 1930 |
| 2,093,521 | Howarth | Sept. 21, 1937 |
| 2,322,004 | Fast | June 15, 1943 |
| 2,348,928 | Sampatacos | May 16, 1944 |

Certificate of Correction

Patent No. 2,480,114   August 30, 1949

DONALD BRADBURY

It is hereby certified that error appears in the printed specification of the above numbered patent requiring correction as follows:

Column 1, line 10, for "tiling" read *tilting*;

and that the said Letters Patent should be read with this correction therein that the same may conform to the record of the case in the Patent Office.

Signed and sealed this 3rd day of January, A. D. 1950.

[SEAL]

THOMAS F. MURPHY,
*Assistant Commissioner of Patents.*